Figure 1:
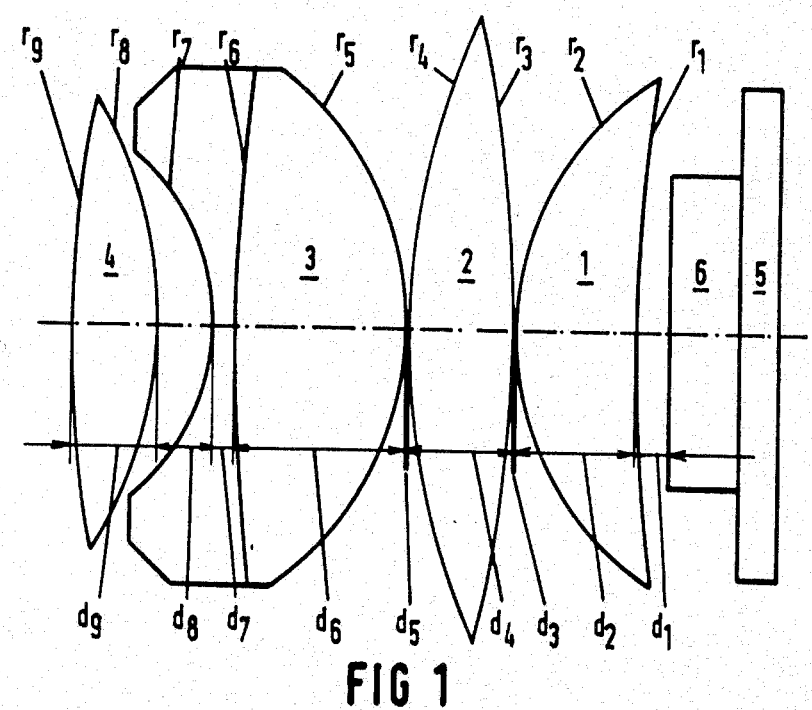

United States Patent

Versteeg

[11] 4,111,528
[45] Sep. 5, 1978

[54] MAGNIFIER

[75] Inventor: Frits Johan Versteeg, Rotterdam, Netherlands

[73] Assignee: N.V. Optische Industrie "de Oude Delft", Delft, Netherlands

[21] Appl. No.: 771,184

[22] Filed: Feb. 23, 1977

[30] Foreign Application Priority Data

Mar. 3, 1976 [NL] Netherlands ............ 7602197

[51] Int. Cl.$^2$ ............................................. G02B 9/34
[52] U.S. Cl. ................................. 350/175 E; 350/223
[58] Field of Search ..................... 350/175 E, 223

[56] References Cited

U.S. PATENT DOCUMENTS

| 3,108,152 | 10/1963 | Hermanni | 350/223 |
| 3,823,999 | 7/1974 | Versteeg | 350/175 E |

FOREIGN PATENT DOCUMENTS 435,947 10/1935 United Kingdom ............ 350/223

*Primary Examiner*—Paul A. Sacher
*Attorney, Agent, or Firm*—Marn & Jangarathis

[57] ABSTRACT

A magnifier having a relative aperture exeeding $f/1$, an angle of view wider than 2° × 25°, and a pupil distance longer than 0.9 $f$, in particular for viewing the anode screen of an image intensifier tube forming part, for example, of a viewing device mounted on a vehicle.

As viewed in the direction of the observer, the magnifier comprises, in succession, (a) a first component consisting of a positive lens;
(b) a second component consisting of a positive power lens;
(c) a third component consisting of a meniscus-shaped lens concave to the observer and comprising two lens components cemented together;
(d) a fourth component consisting of a positive power lens; the sum of the powers of the two refractive surfaces of the second component having a value of between $0.15/f$ and $0.55/f$, the power of the refractive surface of the third component facing the observer having a value of between $0.63/f$ and $1.03/f$, and the sum of the powers of the two refractive surfaces of the fourth component ranging from $0.45/f$ to $0.65/f$.

The magnifier has a large pupil distance, so that the scene on which the viewer is focussed can be properly observed even when the vehicle moves in a bumpy terrain, and yet has a back focal length long enough to allow the use of a plane parallel-sided plate on the anode screen of the image intensifier tube in a thickness sufficient to diminish light diffraction effects and internal reflections therein.

2 Claims, 4 Drawing Figures

MAGNIFIER

This invention relates to a magnifier having a relative aperture exceeding $f/1$, an angular field larger than $2° \times 25°$, a pupil distance larger than $0.9/f$, and, viewed in the direction of the observer, successively formed by:
(a) a first component consisting of a positive lens;
(b) a second component consisting of a positive power lens;
(c) a third component consisting of a meniscus-shaped lens, concave to the observer and comprising two lens components cemented together; and
(d) a fourth component consisting of a positive-power lens; the power of the refractive surface of the third component facing the observer having a value between $0.63/f$ and $1.03/f$, and the sum of the powers of the two refractive surfaces of the fourth component being less than $0.65/f$.

Such a magnifier is known from U.S. Ser. No. 313,331, now patent 3,823,999, which is incorporated herein by reference.

This known magnifier comprises, in addition to the components referred to, a fifth component consisting of a positive-power lens and disposed between the first and the second components, the power of the refractive surface of the third component away from the observer having a value between $0.51/f$ and $0.63/f$, and the sum of the powers of the two refractive surfaces of the fourth component having a value between $0.35/f$ and $0.55/f$.

Such a magnifier is used for viewing the anode screen of an image intensifier tube forming part, for example, of a vehicle-mounted viewing device. By virtue of the large pupil distance of the magnifier, the object or scene on which the viewer is focussed can be properly observed even when the vehicle moves in a bumpy terrain without the observer knocking his head continually against the viewer with the magnifier, or the scene disappearing continually from his field of view.

A disadvantage of this prior magnifier is that, in particular at very short focal distances of the magnifier, such as $f = 7.5$ mm, the back focal length is too short to allow the use of a plane parallel-sided plate on the anode screen of the image intensifier tube on the side of the magnifier in a thickness sufficient to diminish light diffraction effects and internal reflections therein. This may be either one thick plate or an additional plate which may be needed. Indeed, with the prior magnifier, the observer may be hampered by light diffraction effects, which give rise to fogging and poor sharpness.

It is an object of the present invention to eliminate these disadvantages without losing the advantage of the large pupil distance. For this purpose, according to the invention, the magnifier is characterized in that the sum of the powers of the two refractive surfaces of the second component has a value of between $0.15/f$ and $0.55/f$, and the sum of the powers of the two refractive surfaces of the fourth component exceeds $0.45/f$.

Another advantage of the magnifier according to the present invention over and above the prior magnifier is that the former only consists of four components, and is therefore less expensive in manufacture.

Figure 2:
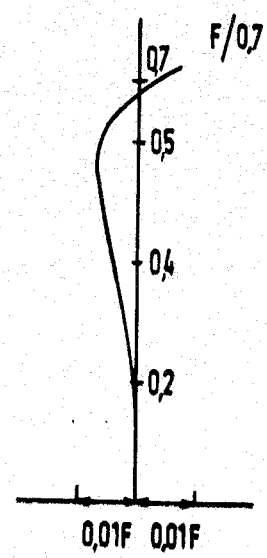
Figure 3:
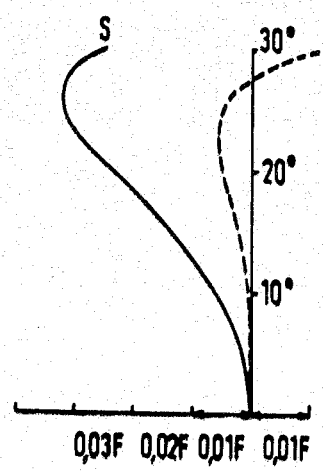
Figure 4:
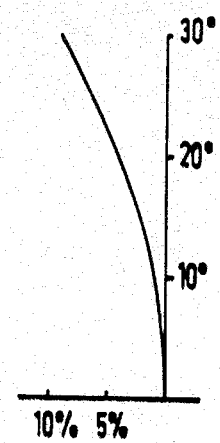

One embodiment of the invention will now be described, by way of example, with reference to the accompanying drawings, in which:

FIG. 1 shows an embodiment of a magnifier according to the present invention; and FIGS. 2–4 show aberration curves of the magnifier of FIG. 1.

FIG. 1 shows an embodiment of a magnifier of the present invention in diagrammatic view. As viewed from left to right, the magnifier comprises a lens of positive power 4, a meniscus-shaped lens 3 having its concave side facing the observer, and comprising two components cemented together, a lens 2 of positive power, and a positive lens 1. This embodiment is dimensioned as follows:

| $f = 1.0$ and pupil distance $= 1.33$ | | $N_e/v_e$ |
|---|---|---|
| $r_1 = -8.1981$ | $d_1 = 0.1273$ | |
| $r_2 = -1.3296$ | $d_2 = 0.5451$ | 1.737/51.4 |
| $r_3 = +5.8038$ | $d_3 = 0.0080$ | |
| $r_4 = -3.1894$ | $d_4 = 0.4786$ | 1.716/53.6 |
| $r_5 = +1.3923$ | $d_5 = 0.0080$ | |
| $r_6 = -8.5846$ | $d_6 = 0.7711$ | 1.716/53.6 |
| $r_7 = +0.9632$ | $d_7 = 0.1064$ | 1.792/25.6 |
| $r_8 = +1.8353$ | $d_8 = 0.2393$ | |
| $r_9 = -5.0548$ | $d_9 = 0.3856$ | 1.748/44.5 |

With a focal distance of $f = 7.5$ mm, the back focal length of this magnifier turned out to be sufficiently large to enable the use of an additional plane parallel-sided plate 6 on plate 5 of the image intensifier tube to diminish internal reflections. The plate of the image intensifier tube consisted of glass having an index of refraction of 1.535 and a thickness of 1.2960 mm, and the additional plate consisted of glass having an index of refraction of 1.625 and a thickness of 2.3933 mm.

FIGS. 2–4 show the aberration curves for spherical aberration, astigmatism and distortion for the magnifier of FIG. 1. As apparent from these curves, the magnifier is well-corrected for a field angle of $2° \times 30°$, while the pupil distance is $1.33 f$.

Finally, the dimensioning of a magnifier similar to that of FIG. 1 will be given, which also turned out to be quite satisfactory for the purposes of the invention. Thus, here again, it was possible to use an additional plane parallel-sided plate against light reflections with an index of refraction of 1.625 and a thickness of 2.3933 mm with a focal distance of $f = 7.5$ mm.

| $f = 1.0$ and pupil distance $= 1.33$ | | $N_e/ve$ |
|---|---|---|
| $r_1 = -8.0523$ | $d_1 = 0.1308$ | |
| $r_2 = -1.3060$ | $d_2 = 0.5451$ | 1.737/51.4 |
| $r_3 = +5.7020$ | $d_3 = 0.0080$ | |
| $r_4 = -3.1336$ | $d_4 = 0.4786$ | 1.716/53.6 |
| $r_5 = +1.4173$ | $d_5 = 0.0080$ | |
| $r_6 = -8.4341$ | $d_6 = 0.7599$ | 1.716/53.6 |
| $r_7 = +0.9470$ | $d_7 = 0.1064$ | 1.792/25.6 |
| $r_8 = +1.8023$ | $d_8 = 0.2393$ | |
| $r_9 = -5.1459$ | $d_9 = 0.3856$ | 1.748/44.5 |

It should be noted that the dimensions are given in random units ($f = 1.0$).

I claim:

1. A magnifier having a relative aperture exceeding $f/1$, an angle of view wider than $2° \times 25°$, and as viewed in the direction of the observer, successively consisting of:
(a) a first component consisting of a positive lens;
(b) a second component consisting of a lens of positive power;
(c) a third component consisting of a meniscus-shaped lens having its concave side facing the observer, and comprising two components cemented together; and
(d) a fourth component consisting of a lens of positive power; the power of the refractive surface of the third component facing the observer having a value between $0.63/f$ and $1.03/f$, and the sum of the powers of the two refractive surfaces of the fourth component being less than $0.65/f$, the improvement which comprises that the sum of the powers of the two refractive surfaces of the second component has a value of between $0.15/f$ and $0.55/f$, and the sum of the powers of the two refractive surfaces of the fourth component exceeds $0.45/f$, said magnifier being characterized by the following dimensions, given in random units:

| $f = 1.0$ and pupil distance $= 1.33$ | | $N_e/v_e$ |
|---|---|---|
| $r_1 = -8.1981$ | $d_1 = 0.1273$ | |
| $r_2 = -1.3296$ | $d_2 = 0.5451$ | 1.737/51.4 |
| $r_3 = +5.8038$ | $d_3 = 0.0080$ | |
| $r_4 = -3.1894$ | $d_4 = 0.4786$ | 1.716/53.6 |
| $r_5 = +1.3923$ | $d_5 = 0.0080$ | |
| $r_6 = -8.5846$ | $d_6 = 0.7711$ | 1.716/53.6 |
| $r_7 = +0.9632$ | $d_7 = 0.1064$ | 1.792/25.6 |
| $r_8 = +1.8353$ | $d_8 = 0.2393$ | |
| $r_9 = -5.0548$ | $d_9 = 0.3856$ | 1.748/44 |

2. A magnifier having a relative aperture exceeding $f/1$, an angle of view wider than $2° \times 25°$, and as viewed in the direction of the observer, successively consisting of:
   (a) a first component consisting of a positive lens;
   (b) a second component consisting of a lens of positive power;
   (c) a third component consisting of a meniscus-shaped lens having its concave side facing the observer, and comprising two components cemented together; and
   (d) a fourth component consisting of a lens of positive power; the power of the refractive surface of the third component facing the observer having a value between $0.63/f$ and $1.03/f$, and the sum of the powers of the two refractive surfaces of the fourth component being less than $0.65/f$, the improvement which comprises that the sum of the powers of the two refractive surfaces of the second component has a value of between $0.15/f$ and $0.55/f$, and the sum of the powers of the two refractive surfaces of the fourth component exceeds $0.45/f$, said magnifier being characterized by the following dimensions, given in random units:

| $f = 1.0$ and pupil distance $= 1.33$ | | $N_e/v_e$ |
|---|---|---|
| $r_1 = -8.0523$ | $d_1 = 0.1308$ | |
| $r_2 = -1.3060$ | $d_2 = 0.5451$ | 1.737/51.4 |
| $r_3 = +5.7020$ | $d_3 = 0.0080$ | |
| $r_4 = -3.1336$ | $d_4 = 0.4786$ | 1.716/53.6 |
| $r_5 = +1.4173$ | $d_5 = 0.0080$ | |
| $r_6 = -8.4341$ | $d_6 = 0.7599$ | 1.716/53.6 |
| $r_7 = +0.9470$ | $d_7 = 0.1064$ | 1.792/25.6 |
| $r_8 = +1.8023$ | $d_8 = 0.2393$ | |
| $r_9 = -5.1459$ | $d_9 = 0.3856$ | 1.748/44.5 |

* * * * *

UNITED STATES PATENT OFFICE
CERTIFICATE OF CORRECTION

Patent No. 4,111,528            Dated September 5, 1978

Inventor(s)     Frits Johan Versteeg

It is certified that error appears in the above-identified patent and that said Letters Patent are hereby corrected as shown below:

Column 3, Line 20, "1.748/44" should be -- 1.748/44.5

Signed and Sealed this

Twenty-fourth Day of April 1979

[SEAL]

Attest:

RUTH C. MASON
*Attesting Officer*

DONALD W. BANNER
*Commissioner of Patents and Trademarks*